United States Patent [19]
Becker et al.

[11] Patent Number: 5,256,290
[45] Date of Patent: Oct. 26, 1993

[54] COOLANT FILTRATION UNIT WITH SLUDGE DRYER

[75] Inventors: Roger T. Becker, Kalamazoo; Leo Inman, Redford, both of Mich.

[73] Assignee: Monlan, Incorporated, Kalamazoo, Mich.

[21] Appl. No.: 869,316

[22] Filed: Apr. 15, 1992

[51] Int. Cl.$^5$ ............................................. B01D 33/00
[52] U.S. Cl. ................... 210/400; 210/160; 210/175; 210/401; 210/406; 210/416.1; 210/526
[58] Field of Search ............... 210/770, 771, 179, 406, 210/416.1, 774, 783, 805, 806, 160, 175, 179, 387, 400, 401, 406, 416.1, 526

[56] References Cited

U.S. PATENT DOCUMENTS

| | | | |
|---|---|---|---|
| 3,970,552 | 7/1976 | Bongert | 210/406 |
| 4,192,747 | 3/1980 | Wykoff | 210/526 |
| 4,203,836 | 5/1980 | Hallack et al. | 210/406 |
| 4,751,006 | 6/1988 | Becker | 210/774 |

OTHER PUBLICATIONS

"Mon-A-Vac coolant filtration systems for machine tool operation" brochure, Monlan Corporation, Mar. 1991, 8 pages.

Primary Examiner—Robert A. Dawson
Assistant Examiner—Sun Uk Kim
Attorney, Agent, or Firm—Flynn, Thiel, Boutell & Tanis

[57] ABSTRACT

A unit for cleaning liquid contaminated with solids, including a housing having a tank section defining a compartment in which contaminated liquid is deposited. The solid contaminants tend to collect as a sludge layer on the bottom wall of the tank section. The housing includes a discharge section having a base wall which inclines upwardly away from one end of the tank section. A conveyor moves along the bottom wall and thence upwardly along the inclined base wall for moving the sludge layer upwardly out of the liquid for discharge at a discharge opening. A dryer is associated with the inclined base wall and includes a pressure chamber disposed under the sludge layer for ejecting plural streams of air upwardly through the sludge layer for effecting removal of moisture therefrom. A suction chamber is disposed directly adjacent the upper side of the sludge layer in opposed relationship to the pressure chamber for collecting the moist air passing through the sludge layer. An air recirculation unit is coupled to both chambers for sucking the moist air to a collection chamber for permitting condensation of the moisture, and then pressurizing the air and returning it to the pressure chamber.

12 Claims, 3 Drawing Sheets

COOLANT FILTRATION UNIT WITH SLUDGE DRYER

FIELD OF THE INVENTION

This invention relates to a coolant filtration unit, such as a unit having a vacuum system associated therewith for effecting removal of solid contaminants from dirty coolant, and more particularly to an improved unit wherein the solid contaminants in the form of sludge is moved through a vacuum-type dryer associated with the discharge section of the unit to effect significant additional drying of the sludge prior to discharge.

BACKGROUND OF THE INVENTION

The coolant used in association with machine tools is relatively costly, and thus an attempt is made to reuse the coolant. During use, however, the coolant becomes highly contaminated with metal chips and the like which must be removed prior to reuse of the coolant.

Various techniques and apparatus have been utilized in an attempt to clean the coolant to permit reuse. One commonly used apparatus employs a vacuum or suction-type separator wherein the contaminated or dirty coolant is deposited into a tank having a cleated drag conveyor movable along a bottom wall thereof, which conveyor collects and removes from the tank the solid contaminants such as metal chips and the like which tend to settle onto the bottom wall. It is also conventional to provide a disposable filter media, such as a paper filter, which is fed along the bottom wall by the conveyor to assist in collecting and removing the contaminants. A pump disposed externally of the tank has an inlet suction pipe which communicates with the coolant in the vicinity of the bottom of the tank, whereby the pump sucks the cleaned coolant from the tank and then pressurizes the coolant so as to supply it to a discharge point for further reuse.

In the separator or filtration unit of the aforementioned type, as the drag conveyor and filter media move along the bottom wall of the main portion of the tank which contains a quantity of dirty coolant therein, the solids which settle to the bottom of the tank collect on the filter media to hence create a layer of sludge-like material which is movably advanced through the tank toward a discharge opening disposed at one end of the apparatus. However, the apparatus also includes a discharge section disposed between the main tank section and the discharge opening. This discharge section slopes upwardly from the tank section to the discharge opening so that the cleated conveyor and filter media are hence moved upwardly along this inclined discharge section to lift the sludge out of the liquid and hence permit additional quantities of liquid to drain by gravity therefrom back into the tank section prior to the filter media and sludge layer being discharged through the discharge opening. However, it has been observed that the sludge layer exiting the apparatus still contains an undesirably high quantity of moisture so that the sludge as deposited into an external receptacle is both wet and heavy. Since this sludge must subsequently be disposed of, either through further processing steps such as drying or incineration, or buried in authorized landfills, the further handling of such wet sludge is complex and/or expensive, with such handling being further complicated by the amount of moisture contained in the sludge since this hence requires either further external drying and treatment or significantly increases the cost of landfill disposal since such costs are normally determined based on volume and weight.

In one prior attempt to remove additional moisture from the sludge prior to discharge from the filtration unit, a suction or vacuum box was positioned within the discharge section directly over the sludge layer as the latter was moved up the inclined bottom wall of the discharge section. This suction box was connected in communication with an exteriorly-located suction unit, such as a motor-blower unit, and the latter in turn merely discharged the air externally of the unit. This suction box, however, was believed to be relatively ineffective, and received little if any commercial acceptance, because it in effect only caused additional air movement within the interior of the discharge section by drawing air from the interior of the unit along the surface of the sludge layer and thence into the suction box. The air had only minimal contact with the sludge layer, namely only along the upper surface thereof, and hence was ineffective in significantly reducing the moisture content of the sludge layer.

Accordingly, it is an object of this invention to provide an improved separating apparatus of the aforesaid type, which apparatus has a drying arrangement associated with the discharge section thereof so as to permit significant additional drying of the sludge layer prior to discharge of the sludge from the apparatus, thereby resulting in the discharged sludge having a significantly increased level of dryness.

More specifically, in the improved separation apparatus of this invention, which apparatus preferably comprises a coolant filtration unit which separates solids from liquid coolant, a vacuum-type dryer is preferably associated with the discharge section of the apparatus to permit passage of warm air transversely through the filter media and the sludge layer deposited thereon as said filter media and sludge layer are moved upwardly through the discharge section after leaving the tank section but prior to reaching the discharge opening. This vacuum-type dryer, by passing air transversely through the sludge layer, hence effects loosening of the material defining the sludge layer and intimate contact with the warm, dry air as it passes therethrough, whereby moisture from the sludge layer is picked up by the air and delivered to an exterior suction tank whereby the moisture can then be condensed and the air recirculated for further passage through the sludge layer. This dryer hence preferably constitutes a substantially closed-loop system so as to at least minimize any possibility of undesired contaminants being exteriorly discharged.

In the improved apparatus of this invention, particularly in the preferred embodiment, the housing of the apparatus includes a main section which defines a tank in which a bath of dirty coolant is contained, and a discharge section which includes a housing structure having a bottom guide wall which inclines upwardly as it projects outwardly away from the main tank section. The discharge section at its upper outer end terminates in a discharge opening for permitting external discharge of the sludge into an exterior receptacle. A suitable device such as an endless drag conveyor moves longitudinally along an intermediate bottom wall of the main tank section and then upwardly along the inclined bottom wall associated with the discharge section until reaching the discharge opening, at which location the drag conveyor is bent back over suitable supportivetype guides or sprockets so as to be resupplied back to the remote end of the tank section. A disposable paper filter media is preferably disposed directly under and moves with the lower reach of the drag conveyor as it moves along the bottom partition and the inclined bottom wall. The heavy solid contaminants in the dirty coolant contained within the tank section settle downwardly and collect on the paper filter media between the flights of the drag conveyor to create a layer of sludge-like material. At the same time, suction is preferably applied to a compartment defined below the bottom partition, the latter preferably being perforated, whereby coolant in the tank section is sucked downwardly through the sludge layer and the paper media, thus causing additional filtering of solids from the coolant, whereupon clean coolant passes into the suction chamber and is suitably removed therefrom for reuse. As the drag conveyor and filter media are slowly moved throughout the length of the tank section, the sludge layer builds up thereon. Upon reaching the discharge end of the tank section, then the drag conveyor and filter media carry the sludge layer upwardly along the inclined bottom wall of the discharge section, causing the sludge layer to be lifted upwardly out of the liquid bath. This permits some gravity-urged drainage of liquid in the sludge layer back into the bath. After leaving the bath and moving upwardly a selected distance along the inclined bottom wall, the sludge layer then moves slowly between cooperating portions of a dryer which is associated with the discharge section. The dryer preferably includes a closed pressure chamber which underlies the inclined bottom wall, the latter being perforated for communication with the pressure chamber, so that pressurized warm and relatively dry air can be discharged upwardly through the bottom wall and thence upwardly through the filter media and the sludge layer to effect removal of moisture therefrom. The dryer also includes a suction chamber positioned substantially coextensively with the pressure chamber but on the other side of the sludge layer so as to draw therein the moist air which passes upwardly through the sludge layer. This moist air from the pressure chamber is recirculated back to a motor-blower unit due to suction created by the blower. The moisture in the air is allowed to condense in a collection chamber associated with the motor-blower unit for resupply to the bath. The motor-blower unit effects repressurization of the air and causes the air to be resupplied to the pressure chamber. The heat generated by the motor-blower unit is effective in warming the air as resupplied to the pressure chamber.

Other objects and purposes of the invention will be apparent to persons familiar with apparatus of this general type upon reading the following specification and inspecting the accompanying drawings.

Figure 1:
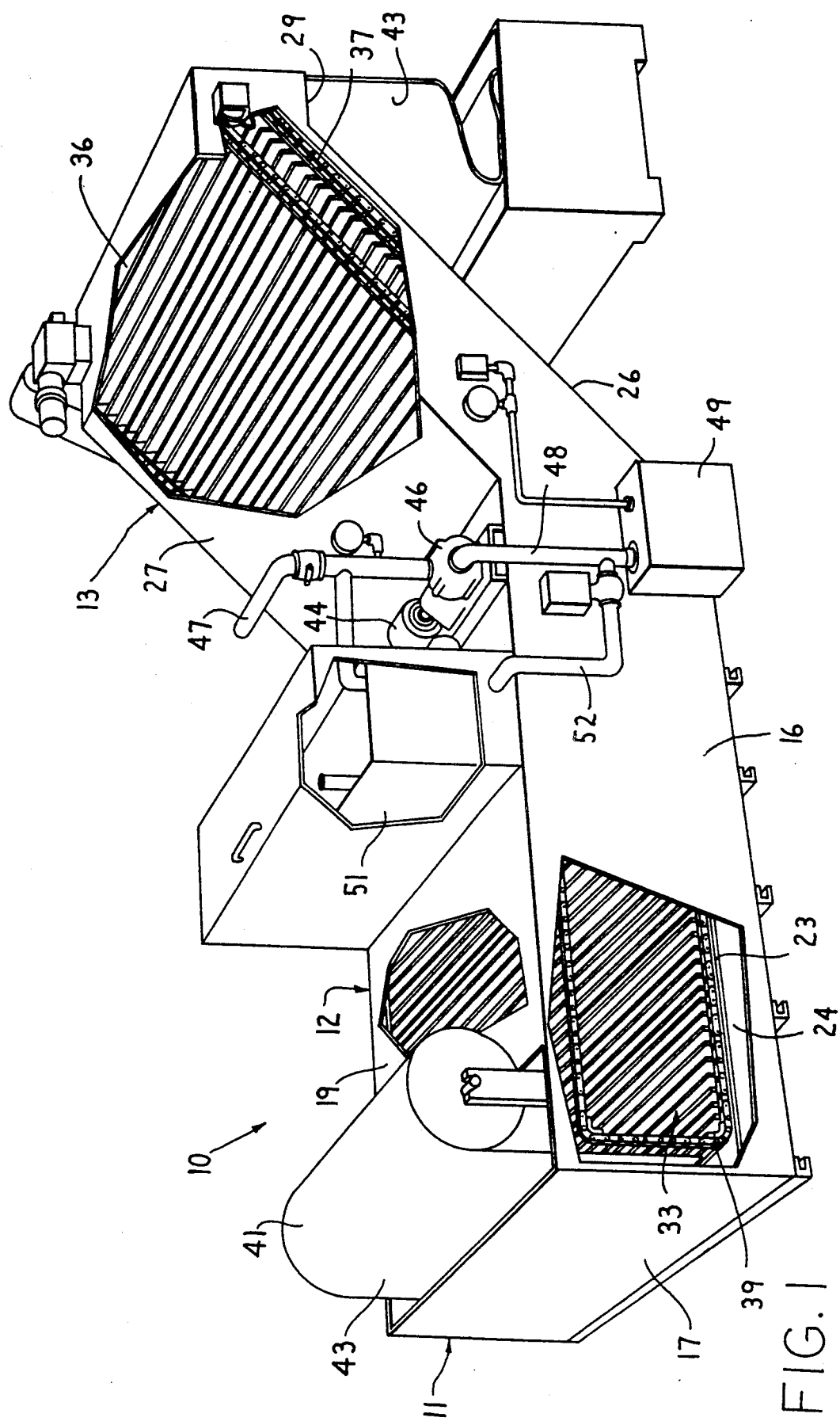
FIG. 1 is a perspective view illustrating a conventional vacuum-type filtration system which is desirably used for effecting separation of contaminants, specifically solids, from a liquid such as a coolant.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Figure 2:
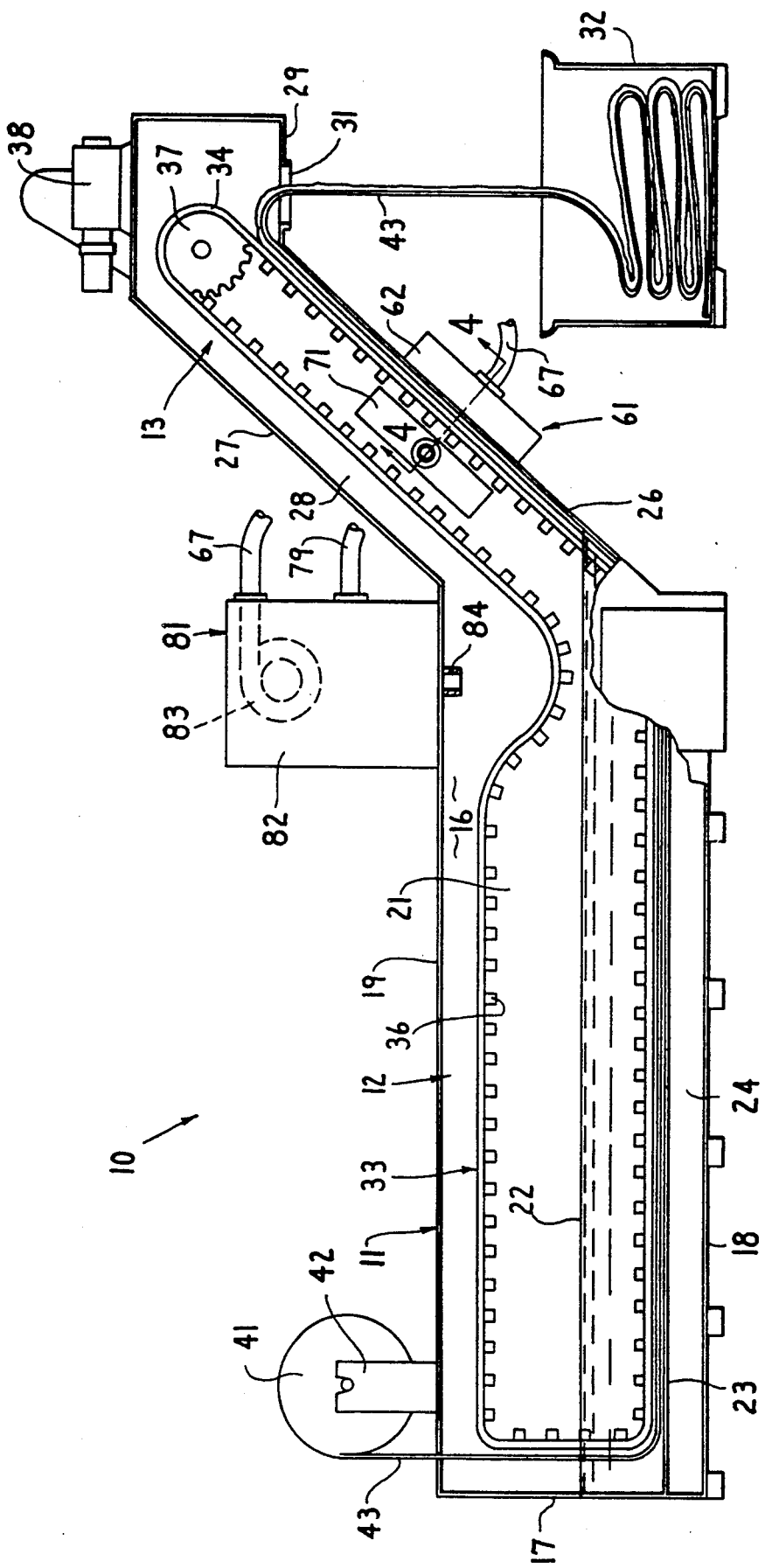
FIG. 2 is a side sectional view, substantially in cross-section, illustrating the general arrangement of FIG. 1 but incorporating therein the improved dryer arrangement according to the present invention. Parts of the conventional system of FIG. 1 have been eliminated from FIG. 2 for clarity of illustration.

In FIGS. 1 and 2, there is illustrated a liquid-solid separation unit 10, specifically a coolant filtration unit, according to the present invention. The filtration or separation unit 10 is preferably of the vacuum or suction type and is basically a self-contained unit.

Referring specifically to FIG. 1, which illustrates a conventional filtration unit 10, this unit 10 includes a main housing or tank structure 11 which defines a main tank section 12 which effectively functions as the separating or filtration section, and a sludge discharge section 13 which is inclined so as to project outwardly and upwardly from one end of the main tank section 12.

The main tank section 12 has opposed and generally parallel sidewalls 16, end wall 17, bottom wall 18 and top wall 19. At least part of the top wall 19 may be open to permit dirty coolant to be deposited in the tank section. This main tank section 12 hence defines therein a main storage compartment 21 for receiving a batch of dirty coolant, which batch hence creates a bath of coolant in the tank section, such as indicated at 22. The bottom of compartment 21 is defined at least in part by an intermediate bottom wall or partition 23, below which there is defined a secondary compartment 24 for the clean coolant. The intermediate bottom wall 23 is suitably apertured or perforated to permit the coolant to flow downwardly from the main compartment 21 into the secondary compartment 24.

The sludge discharge section 13 of the unit projects outwardly and inclines upwardly from one end of the tank section 12 and includes a bottom wall 26 and a top wall 27, which walls extend generally parallel and incline upwardly at an angle of about 45° as they project outwardly from one end of the tank section 12. These bottom and top walls 26–27 are joined to extensions of the sidewalls 16 so as to define within the discharge section 13 a hollow chamber 28 which at its lower end communicates with the chamber 21. The bottom wall 26 at its upper end joins to a further wall 29 which defines therethrough a discharge opening 31 which communicates with the upper end of the chamber 28.

The main compartment 21, in which is contained the dirty coolant 22, has means associated therewith for effecting removal of solid contaminants such as metal chips and the like. This latter-mentioned means, in the illustrated embodiment, comprises a conventional flight-type drag conveyor 33 which is effective for collecting the solids which settle by gravity to the bottom of the compartment 21, and thence removing the solids and sludge for external discharge. This drag conveyor 33 comprises a pair of sidewardly spaced endless conveyor chains 34 having a plurality of flights or drag bars 36 extending transversely therebetween. The conveyor chains 34 at one end thereof extend around sprockets 37 which are rotatably driven by a suitable drive source, such as a motor and gear-reducer unit 38. The conveyor chains also supportingly engage and bend around other suitable supports 39, which may comprise guide sprockets if desired, to maintain the conveyor 33 in the desired configuration as it moves through the compartments 21 and 28. The conveyor chains and the drag bars thereon, particularly as associated with the lower reach of the conveyor, move along the intermediate bottom wall 23 whereupon they pick up the sludge and heavy contaminants which settle to the bottom of compartment 21, which contaminants and sludge are carried upwardly along the inclined bottom wall 26 and are externally discharged through the opening 31 for deposit in a suitable exteriorly-located receptacle or hopper 32.

The unit 10 also preferably incorporates a disposable filter media to assist in collecting and removing the finer contaminants. For example, a roll 41 of filter media is supported adjacent one end of the tank by suitable supports 42, whereupon the thin sheetlike web 43 of filter media is withdrawn from the roll and passes downwardly into the compartment 21 in the vicinity of the end wall 17 and then passes along the upper surface of the intermediate bottom wall 23 directly below the lower reach of the drag conveyor 33. The filter media web 43, which is preferably a conventional filter paper, is slidably moved through the tank section by the drag conveyor so as to collect thereon both the large and fine contaminants to hence cause creation of a sludge-like layer thereon, with this filter media web 43 then being discharged through the opening 31 into the receptacle 32.

The unit 10, as illustrated by FIG. 1, includes a motor 44 which drives a pump 46, the discharge 47 of which supplies the clean coolant back to a machine tool. The pump 46 has an inlet or supply pipe 48 which connects to a vacuum box 49, the latter in turn being in communication with the secondary or suction chamber 24 for effecting withdrawal of the cleaned coolant.

The unit 10, in the illustrated embodiment, may also be provided with an auxiliary storage tank 51 in which a quantity of clean coolant is stored, which clean coolant can be withdrawn and recirculated back to the machine tool as desired. For this purpose, a supply pipe 52 communicates between the tank 51 and the supply pipe 48, which pipe 52 is normally closed by a suitable valve.

The overall arrangement as described above is conventional so that further description thereof is believed unnecessary.

Figure 3:
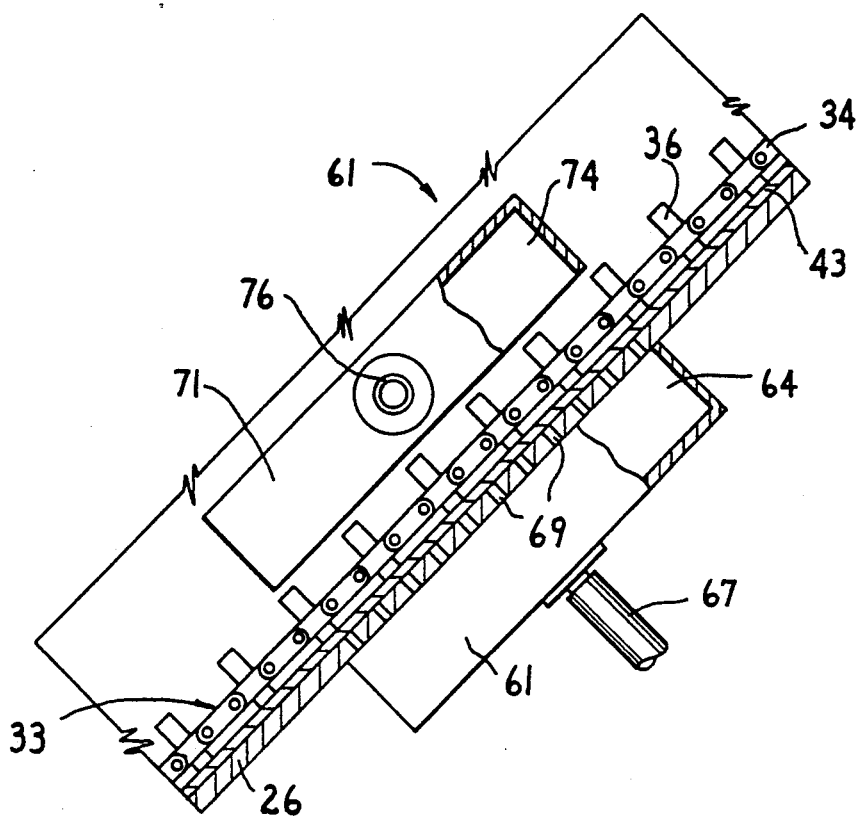
FIG. 3 is an enlarged, fragmentary view, partially in cross-section, of the drying apparatus as associated with the discharge section.

In the improved unit 10 of this invention, the discharge section 13 is provided with a dryer 61 (FIGS. 2-4) for causing a substantially continuous movement of air transversely through the sludge layer as the latter moves upwardly along the inclined bottom wall 26 so as to effect additional drying of the sludge layer prior to external discharge thereof.

Figure 4:
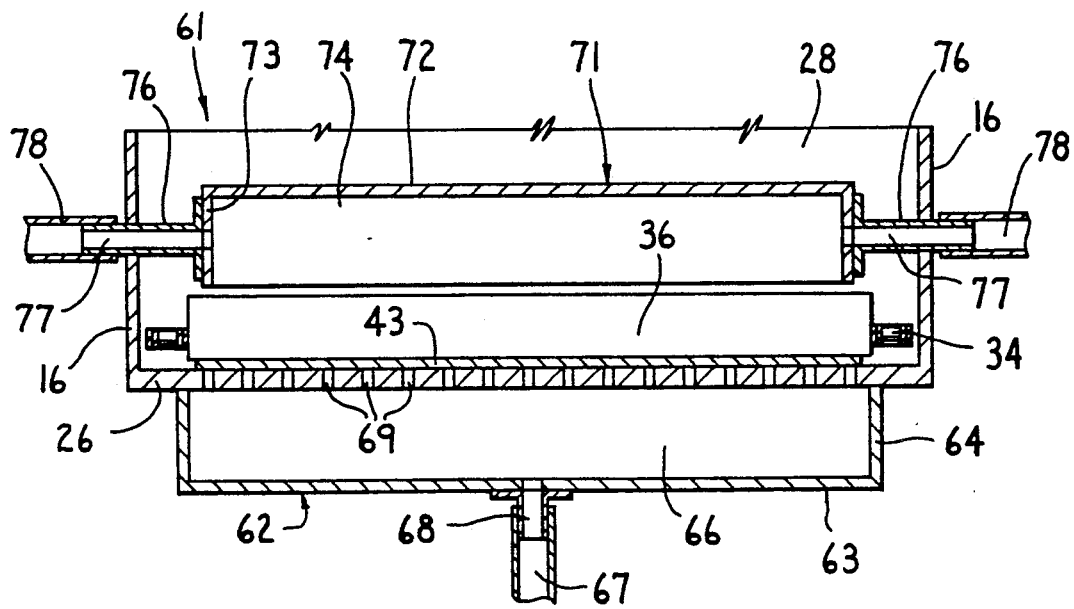
FIG. 4 is an enlarged fragmentary sectional view taken substantially along line 4—4 of FIG. 2.

The dryer 61 includes a box-like housing 62 secured to the underside of the inclined bottom wall 26. This housing 62 is defined by a generally flat base wall 63 having a substantially rectangular ring-shaped sidewall 64 fixed thereto and projecting upwardly therefrom. The free edge of the sidewall 64 is fixedly secured, as by welding or the like, to the inclined bottom wall 26 so that this latter wall 26 hence effectively closes off the topside of the housing 62, whereby the latter defines therein a pressure chamber 66. An air supply conduit or hose 67 has its discharge end connected to a nipple which defines an inlet opening 68 formed centrally of the base wall 63 for communication with the pressure chamber 66. The region of the inclined bottom wall 26 which overlies the pressure chamber 66 is also provided with a plurality of small openings or apertures 69 extending perpendicularly therethrough for providing communication between the pressure chamber 66 and the discharge chamber 28. These openings are preferably disposed in a uniformly spaced gridlike pattern or arrangement which extends both widthwise and lengthwise of the pressure chamber. Further, the pressure chamber 66 preferably has a width, as illustrated by FIG. 4, which extends across substantially the full width of the chamber 28 to hence underlie substantially the full width of the filter media 43 and the sludge layer thereon.

Dryer 61 includes a further housing 71 which is of similar construction to the housing 62 in that it includes a generally flat base wall 72 having a substantially rectangular peripheral sidewall 73 projecting therefrom. This box-like housing 71 is positioned within the compartment 28 closely adjacent but directly above the conveyor 33. The lower or bottom side of box-like housing 72 defines a generally enlarged opening, as defined by the lower free edge of the rectangular sidewall 73, with the upper housing 71 hence defining therein a suction chamber 74 which opens downwardly through the open bottom of the housing. The upper housing 71 is positioned so as to be substantially directly opposed to the lower housing 62, but the two are spaced a sufficient distance apart so as to enable the inclined bottom wall 26, the filter media web 43 and the drag conveyor 33 to be interposed therebetween. The lower free edge of the upper housing 72 is preferably disposed so as to be closely adjacent to but not interfere with the movement of the flights 36 of the drag conveyor, substantially as illustrated by FIG. 4. The suction chamber 74 as defined by the upper housing 71 is hence substantially aligned with the gridwork of openings 69 which extend through the inclined bottom wall 26.

The upper housing 71 has a pair of hollow stub shafts 76 fixed to opposite sides thereof and projecting outwardly through the adjacent housing sidewalls 16. The stub shafts 76 are fixed to both the housing 71 and the sidewalls 16 to hence stationarily support the housing 71 in suspended relationship within the compartment 28 closely adjacent but directly above the conveyor 33. These stub shafts 76 define discharge passages 77 therethrough, the latter communicating with the central portion of the suction chamber 77 adjacent opposite sides thereof. Each of the stub shafts 76 also externally connects to one end of a suction hose or conduit 78. The pair of suction hoses 78 in turn join to a further suction hose 79 (FIG. 2) through a conventional Y- or T-shaped coupling (not shown), and this suction hose 79 in turn couples to an air recirculation unit 81.

The air recirculation unit 81 comprises a housing 82 having a conventional motor-blower unit 83 disposed interiorly thereof. The suction hose 79 communicated with a closed chamber within the interior of the housing 82 and hence supplies air into the inlet of the blower section of the motor-blower unit 83. The discharge from the blower section in turn communicates directly with the air supply hose 67 for returning the pressurized air to the pressure chamber 66. The moisture in the air which is supplied through the suction hose 79 into the interior compartment of the housing 82 condenses within the housing due to the cooler temperature thereof and due to contact with surfaces of the housing, which contact can be further increased by providing the interior of the housing with additional interior fins or plates so as to assist in the condensation process. This moisture which condenses within the housing, being primarily coolant, is then resupplied from the housing back into the compartment 21 through a suitable drain opening 84 provided in the bottom of the housing 82.

The waste heat generated by the motor-blower unit 83, specifically the motor-generated heat, is also utilized to heat the air passing through the blower so that the pressurized air supplied to the supply hose 67 is hence warmer than the air which is returned through the suction hose 79.

OPERATION

The basic operation of the separation or filtration unit 10 with respect to separation of solids from liquid and the creation of a sludge layer on the filter web 43, and the external discharge thereof, is conventional and has already been summarized in the description set forth above. Further detailed description of the operation of unit 10 is hence believed unnecessary, and thus the following operational description will relate solely to a brief summary of the operation of the dryer 61 as associated with the unit 10.

As the conveyor 33 moves the filter web 43 and the sludge layer supported thereon upwardly along the inclined bottom wall 26, all of the moving parts and materials (namely the conveyer 33, filter web 43 and sludge layer) are progressively moved into, through and then out of the drying region defined between the opposed pressure and suction chambers 66 and 74, respectively. The movement of the sludge layer into and through the drying region typically occurs either by means of a very slow but continuous upward movement along the inclined bottom wall 26, or by means of an intermittent steplike movement, either being suitable depending upon the type of drive provided by the drive unit 38 and the controls therefor.

As the sludge layer passes through the drying region defined between the housings 62 and 71, the motor-blower unit 83 supplies pressurized dry warm air to the supply hose 67 which in turn supplies the pressurized air to the pressure chamber 66. Since the escape of air from the chamber 66 is possible solely through the gridwork of small openings or orifices 69, the air within chamber 66 hence normally remains at a pressure level which is at least slightly greater than atmospheric pressure. This hence causes the pressurized air within chamber 66 to flow through the gridwork of small openings or orifices 69, which orifices create a large plurality of small air jets which direct the dry warm pressurized air upwardly through the filter web 43 and thence through the sludge layer deposited thereon. Due to the rather large rectangular gridlike pattern created by the orifices 69, the air jets hence are disposed across substantially the full width of the sludge layer and also extend longitudinally of the sludge layer (that is, in the direction of movement thereof) over a significant distance. The jets of air are thus discharged upwardly through the sludge layer over a rather large rectangular surface area, and such air jets continue to be discharged upwardly through the sludge area for a significant period of time corresponding to the length of time that it takes for the sludge layer, at any point thereon, to pass entirely through the drying region. As the air moves upwardly through the sludge layer, the air picks up moisture from the sludge to hence effect at least partial drying of he sludge. The moist air, after passing through the sludge layer, is then collected within the suction chamber 74. Since this chamber 74 communicates via suction hoses 78 and 79 with the suction or inlet side of the motor-blower 83, this tends to create at least a partial suction within the chamber 74 which, in conjunction with the jetting of pressurized air from pressure chamber 66 upwardly through orifices 69 and thence through the sludge layer toward the suction chamber 74, hence causes the moist air to be sucked into the chamber 74 and thence through the hoses 78-79 for supply back to the recirculation unit 81. The cooler moist air from suction hose 79 undergoes some condensation of the vapors within the chamber of the unit 81, with the air then being warmed and pressurized by the motor-blower unit 83 so as to be recirculated back to the pressure chamber 66.

Due to the removal of additional moisture from the sludge layer when passing through the drying region defined between the pressure housing 62 and the suction housing 71, significant additional drying of the sludge layer is accomplished whereby the sludge layer when discharged through the opening 31 into the receptacle 32 thus contains significantly less moisture, and is additionally hence of significantly less weight, thereby facilitating further handling and/or disposal of the sludge.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a self-contained filtration unit for cleaning a quantity of liquid containing solid contaminants, said unit including a main housing structure defining both a tank section and a discharge section, said discharge section being joined to one end of said tank section, said tank section including a first bottom wall and upright side walls projecting upwardly from said first bottom wall and cooperating therewith to define a compartment for containing a quantity of liquid containing said solid contaminants which collect as a sludge layer on said first bottom wall, said discharge section including a second bottom wall and side walls projecting upwardly from opposite sides thereof, said second bottom wall being joined to said first bottom wall adjacent said one end of said tank portion and projecting outwardly away from said tank section, said second bottom wall being inclined upwardly as it extends outwardly away from said tank section with said second bottom wall inclining upwardly to an elevation significantly above the level of liquid in said compartment, said discharge section also including means defining a discharge opening for said sludge layer adjacent an upper end of said second bottom wall, and contaminant removing means associated with said second structure for effecting removal of the sludge layer which collects in the bottom if said compartment, said contaminant removing means including conveyor means positioned within said housing structure adjacent to and movable along said first and second bottom walls for moving said sludge layer along said first bottom wall and thence upwardly along the inclined second bottom wall for discharge of the sludge layer through said discharge opening, the improvement comprising dryer means associated with said discharge section for discharging streams of warm air transversely upwardly through the sludge layer for effecting removal of moisture from the sludge layer, said dryer means being disposed adjacent said second bottom wall at a location between said discharge opening and the point where said conveyor means moves the sludge layer upwardly above the level of the liquid in the compartment.

2. A unit according to claim 1, wherein said dryer means includes pressure chamber means to which pressurized air is supplied, and suction chamber means from which air is sucked, said pressure and suction chamber means being fixedly positioned relative to said housing structure and disposed in closely adjacent and opposed relationship but on opposite vertical sides of said sludge layer with the pressure chamber means below the sludge layer and the suction chamber means above the sludge layer so that air in moving from said pressure chamber means to said suction chamber means passes transversely upwardly through said sludge layer.

3. A unit according to claim 1, wherein said dryer means defines a closed loop system and includes a pressure chamber disposed directly adjacent and below the sludge layer, a suction chamber disposed directly adjacent and above the sludge layer in generally opposed relationship to the pressure chamber, and conduit means including blower means connected between said pressure and suction chambers for sucking air from the suction chamber and supplying pressurized air into the pressure chamber so that the air from the pressure chamber is discharged upwardly through the sludge layer into the suction chamber.

4. In a self-contained filtration unit for cleaning a quantity of liquid containing solid contaminants, said unit including a main housing structure defining both a tank section and a discharge section, said discharge section being joined to one end of said tank section, said tank section including a first bottom wall and upright side walls projecting upwardly from said first bottom wall and cooperating therewith to define a compartment for containing a quantity of liquid containing said solid contaminants which collect as a sludge layer on said first bottom wall, said discharge section including a second bottom wall and side walls projecting upwardly from opposite sides thereof, said second bottom wall being joined to said first bottom wall adjacent said one end of said tank section and projecting outwardly away from said tank section, said second bottom wall being inclined upwardly as it extends outwardly away from said tank section with said second bottom wall inclining upwardly to an elevation significantly above the level of liquid in said compartment, said discharge section also including means defining a discharge opening for said sludge layer adjacent an upper end of said second bottom wall, and contaminant removing means associated with said housing structure for effecting removal of the sludge layer which collects in the bottom of said compartment, said contaminant removing means including conveyor means positioned within said housing structure adjacent to and movable along said first and second bottom walls for moving said sludge layer along said first bottom wall and thence upwardly along the inclined second bottom wall for discharge of the sludge layer through said discharge opening, the improvement comprising:

dryer means associated with said discharge section for discharging streams of air transversely through the sludge layer for effecting removal of moisture from the sludge layer, said dryer means being disposed adjacent said second bottom wall at a location between said discharge opening and the point where said conveyor means moves the sludge layer upwardly above the level of the liquid in the compartment;

said dryer including pressure chamber means to which pressurized air is supplied, and suction chamber means from which air is sucked, said pressure and suction chamber means being fixedly positioned relative to said housing structure and disposed in closely adjacent and opposed relationship but on opposite vertical sides of said sludge layer so that air in moving from said pressure chamber means to said suction chamber means passes transversely upwardly through said sludge layer;

said pressure and suction chamber means respectively defining therein pressure and suction chambers which are of large cross-sectional areas within substantially parallel planes which extend generally parallel with the sludge layer, and said pressure chamber means including a control wall which is disposed closely adjacent said sludge layer and extends substantially over said cross-sectional area for separating said pressure chamber from said sludge layer, said control wall having a plurality of small openings extending therethrough for permitting pressurized air in said pressure chamber to pass outwardly through said small openings for discharge directly through the sludge layer, said suction chamber being disposed in directly opposed relationship to said control wall with said sludge layer being interposed directly therebetween.

5. A unit according to claim 4, including air recirculation means for sucking the moist air out of said suction chamber and for condensing the moisture from the removed air and then pressurizing the air and resupplying it back to the pressure chamber.

6. A unit according to claim 5, wherein said pressure chamber means is defined by a hollow housing having a base wall which is generally parallel with and spaced from said control wall so as to define said pressure chamber therebetween, and a pressurized air supply conduit extending from said recirculation means to said pressure chamber means, said supply conduit coupling to said base wall substantially adjacent the center thereof for discharging pressurized air into said pressure chamber substantially directly toward said control wall.

7. A unit according to claim 6, wherein said control wall is defined by and constitutes a part of said second bottom wall, said housing being fixed to and projecting outwardly from said second bottom wall.

8. A unit according to claim 7, wherein said pressure chamber means is disposed below said sludge layer so as to discharge the air streams upwardly through the sludge layer.

9. In a self-containing filtration unit for cleaning a quantity of liquid containing solid contaminants, said unit including a main housing structure defining both a tank section and a discharge section, said discharge section being joined to one end of said tank section, said tank section including a first bottom wall and upright side walls projecting upwardly from said first bottom wall and cooperating therewith to define a compartment for containing a quantity of liquid containing said solid contaminants which collect as a sludge layer on said first bottom wall, said discharge section including a second bottom wall and side walls projecting upwardly from opposite sides thereof, said second bottom wall being joined to said first bottom wall adjacent said one end of said tank section and projecting outwardly away from said tank section, said second bottom wall being inclined upwardly as it extends outwardly away from said tank section with said second bottom wall inclining upwardly to an elevation significantly above the level of liquid in said compartment, said discharge section also including means defining a discharge opening for said sludge layer adjacent an upper end of said second bottom wall, and contaminant removing means associated with said housing structure for effecting removal of the sludge layer which collects in the bottom of said compartment, said contaminant removing means including conveyor means positioned within said housing structure adjacent to and movable along said first and second bottom walls for moving said sludge layer along said first bottom wall and thence upwardly along the inclined second bottom wall for discharge of the sludge layer through said discharge opening, the improvement comprising:

dryer means associated with said discharge section for discharging streams of air transversely through the sludge layer for effecting removal of moisture from the sludge layer, said dryer means being disposed adjacent said second bottom wall at a location between said discharge opening and the point where said conveyor means moves the sludge layer upwardly above the level of the liquid in the compartment;

said dryer including pressure chamber means to which pressurized air is supplied, and suction chamber means from which air is sucked, said pressure and suction chamber means being fixedly positioned relative to said housing structure and disposed in closely adjacent and opposed relationship but on opposite vertical sides of said sludge layer so that air in moving from said pressure chamber means to said suction chamber means passes transversely upwardly through said sludge layer; and said pressure chamber means is disposed below said sludge layer so as to discharge the air streams upwardly through the sludge layer.

10. A unit according to claim 9, including air recirculation means for sucking the moist air out of said suction chamber and for condensing the moisture from the removed air and then pressurizing the air and resupplying it back to the pressure chamber.

11. A unit according to claim 10, wherein the pressure chamber means includes a control wall which is defined by and constitutes a part of said second bottom wall, and said pressure chamber means including a hollow housing which is fixed to and projects outwardly from said control wall for defining a pressure chamber therein.

12. In a self-contained filtration unit for cleaning a quantity of liquid containing solid contaminants, said unit including a main housing structure defining both a tank section and a discharge section, said discharge section being joined to one end of said tank section, said tank section including a first bottom wall and upright side walls projecting upwardly from said first bottom wall and cooperating therewith to define a compartment for containing a quantity of liquid containing said solid contaminants which collect as a sludge layer on said first bottom wall, said discharge section including a second bottom wall and side walls projecting upwardly from opposite sides thereof, said second bottom wall being joined to said first bottom wall adjacent said one end of said tank section and projecting outwardly away from said tank section, said second bottom wall being inclined upwardly as it extends outwardly away from said tank section with said second bottom wall inclining upwardly to an elevation significantly above the level of liquid in said compartment, said discharge section also including means defining a discharge opening for said sludge layer adjacent an upper end of said second bottom wall, and contaminant removing means associated with said housing structure for effecting removal of the sludge layer which collects in the bottom of said compartment, said contaminant removing means including conveyor means positioned within said housing structure adjacent to and movable along said first and second bottom walls for moving said sludge layer along said first bottom wall and thence upwardly along the inclined second bottom wall for discharge of the sludge layer through said discharging opening, the improvement comprising:

dryer means associated with said discharge section for discharging streams of air transversely through the sludge layer for effecting removal of moisture from the sludge layer, said dryer means being disposed adjacent said second bottom wall at a location between said discharge opening and the point where said conveyor means moves the sludge layer upwardly above the level of the liquid in the compartment;

said dryer including pressure chamber means to which pressurized air is supplied, and suction chamber means from which air is sucked, said pressure and suction chamber means being fixedly positioned relative to said housing structure and disposed in closely adjacent and opposed relationship but on opposite vertical sides of said sludge layer so that air in moving from said pressure chamber means to said suction chamber means passes transversely upwardly through said sludge layer; and said suction chamber means comprising a hollow housing which defines therein a suction chamber with said housing having a bottom side thereof defining an enlarged opening for communication with said suction chamber, said housing defining said suction chamber means being disposed with the lower edge thereof disposed generally parallel with and closely adjacent but spaced slightly upwardly from an upper surface of said sludge layer so that air passing upwardly through the sludge layer will directly pass through the large opening into said suction member.

* * * * *

UNITED STATES PATENT AND TRADEMARK OFFICE
CERTIFICATE OF CORRECTION

PATENT NO. : 5 256 290
DATED : October 26, 1993
INVENTOR(S) : Roger T. Becker et al It is certified that error appears in the above-identified patent and that said Letters Patent is hereby corrected as shown below:

```
Column 8, line 54; change "portion" to ---section---.
         line 63; change "second" to ---housing---.
         line 64; change "if" to ---of---.

Column 12, line 62; change "member." to ---chamber.---.
```

Signed and Sealed this

Nineteenth Day of April, 1994

*Attest:*

BRUCE LEHMAN

*Attesting Officer*    Commissioner of Patents and Trademarks